United States Patent [19]

Groce et al.

[11] Patent Number: 4,527,828
[45] Date of Patent: Jul. 9, 1985

[54] SIDE MOUNTED JUMP SEAT FOR AN AUTOMOTIVE VEHICLE

[75] Inventors: James S. Groce, Utica; Edward A. Sabo, Clarkston, both of Mich.

[73] Assignee: General Motors Corporation, Detroit, Mich.

[21] Appl. No.: 521,136

[22] Filed: Aug. 8, 1983

[51] Int. Cl.³ .............................................. B60N 1/02
[52] U.S. Cl. ..................... 296/65 R; 296/63; 297/14
[58] Field of Search ......................... 296/63, 64, 65 R; 297/14, 331, 335

[56] References Cited

U.S. PATENT DOCUMENTS

| 1,307,840 | 6/1919 | Williams | 297/14 X |
| 1,685,137 | 9/1928 | Nichols | |
| 2,235,984 | 3/1941 | Deveraux | 16/135 |
| 2,797,732 | 7/1957 | Thomas | 297/14 X |
| 3,589,762 | 6/1971 | Henrikson | 297/331 X |
| 3,594,037 | 7/1971 | Sherman | 297/14 |
| 4,088,280 | 5/1978 | Arlauskas et al. | 242/107 |
| 4,460,215 | 7/1984 | Chamberlain et al. | 297/14 |

OTHER PUBLICATIONS

1980 Ford Truck Manual, p. 41-20-1.

Primary Examiner—Robert B. Reeves
Assistant Examiner—Russell D. Stormer
Attorney, Agent, or Firm—William A. Schuetz

[57] ABSTRACT

A jump seat assembly is disclosed for use with vehicles, such as pickup trucks having extended cabs to provide for cargo space rearwardly of the front seat. The seat assembly is foldable into a recess in the side of the cab when stored so that it is flush with the adjacent interior trim structure. The seat assembly is supported in a cantilever fashion when moved to its seating position and is swingable about a skewed axis away from the rear of the cab when moved to its seating position so as to be located wholly outside of the recess and provide more room for a seated passenger.

6 Claims, 7 Drawing Figures

SIDE MOUNTED JUMP SEAT FOR AN AUTOMOTIVE VEHICLE

The present invention relates to a foldable seat assembly for an automotive vehicle, and more particularly to a foldable jump seat assembly which is supported in cantilever fashion when in its seating position and which is foldable to a storage position in which it is flush with adjacently located interior trim structure.

Heretofore, foldable auxiliary seats for use in vehicles have been provided. U.S. Pat. No. 1,685,137 shows a foldable seat which folds against a wall for storage. The 1980 Ford Motor Company Bronco F series supercab models had optional folding side mounted rear seats which were designed to fold upwardly against the side of the cab for storage. These seats, however, were not flush with adjacent interior trim structure when stored and were not cantilever supported when in their seating position.

In accordance with the provisions of the present invention, a novel jump seat assembly is provided which is especially useful in pickup trucks having extended cabs which provide for a cargo space rearwardly of its front seat. The seat assembly is foldable into a recess in the side of the cab when stored so that it is flush with the adjacent interior side structure so that it does not take up any of the cargo space. The seat assembly is also supported in a cantilever fashion when moved to its seating position and is swingable away from the rear of the cab when moved to its seating position so as to be located wholly outside of the recess and provide more room for a seated passenger whereby comfort is enhanced.

Accordingly, an important object of the present invention is to provide a new and improved jump seat assembly having a seat and a seat back for use in automotive vehicles, preferably a pickup truck having an extended cab which is defined by rear and side walls to provide a cargo space rearwardly of the truck's front seat, and in which the jump seat assembly is foldable between a storage position in which the seat is received within a recess in the side wall and is flush with the side wall interior trim structure so that it does not take up any of the cargo space and a seating position in which the seat is supported in a cantilever fashion and located in the cargo space wholly outside the recess.

Another object of the present invention is to provide a new and improved jump seat assembly, as defined in the preceding object, and wherein the seat is pivotally supported for movement about an axis which is skewed with respect to a horizontal plane and skewed with respect to the plane of its adjacent side wall so that the seat when moved from its storage position towards its seating position swings down away from the side and rear walls so that the seat and seat back are wholly disposed within the cargo space and located forwardly of the recess.

Yet another object of the present invention is to provide a new and improved jump seat assembly, as defined in the preceding objects, wherein the seat assembly includes an overcenter spring means which is operable to both biasingly hold the seat assembly in the storage position when moved thereto and to biasingly hold the seat assembly in its seating position when moved thereto.

A further object of the present invention is to provide a new and improved jump seat assembly, as defined in the preceding objects, and wherein the seat assembly includes an inertia latch means operatively connected with the seat back rest for locking the latter in its position upon the vehicle being subject to lateral impact forces.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

The present invention provides a novel jump seat assembly 10 for use with an automotive vehicle. Although the novel jump seat assembly 10 could be used with various kinds of automotive vehicles, it is especially adapted for use with pickup trucks having extended cabs. Accordingly, the jump seat assembly 10 will be described as being used in connection with such a pickup truck.

Figure 1:
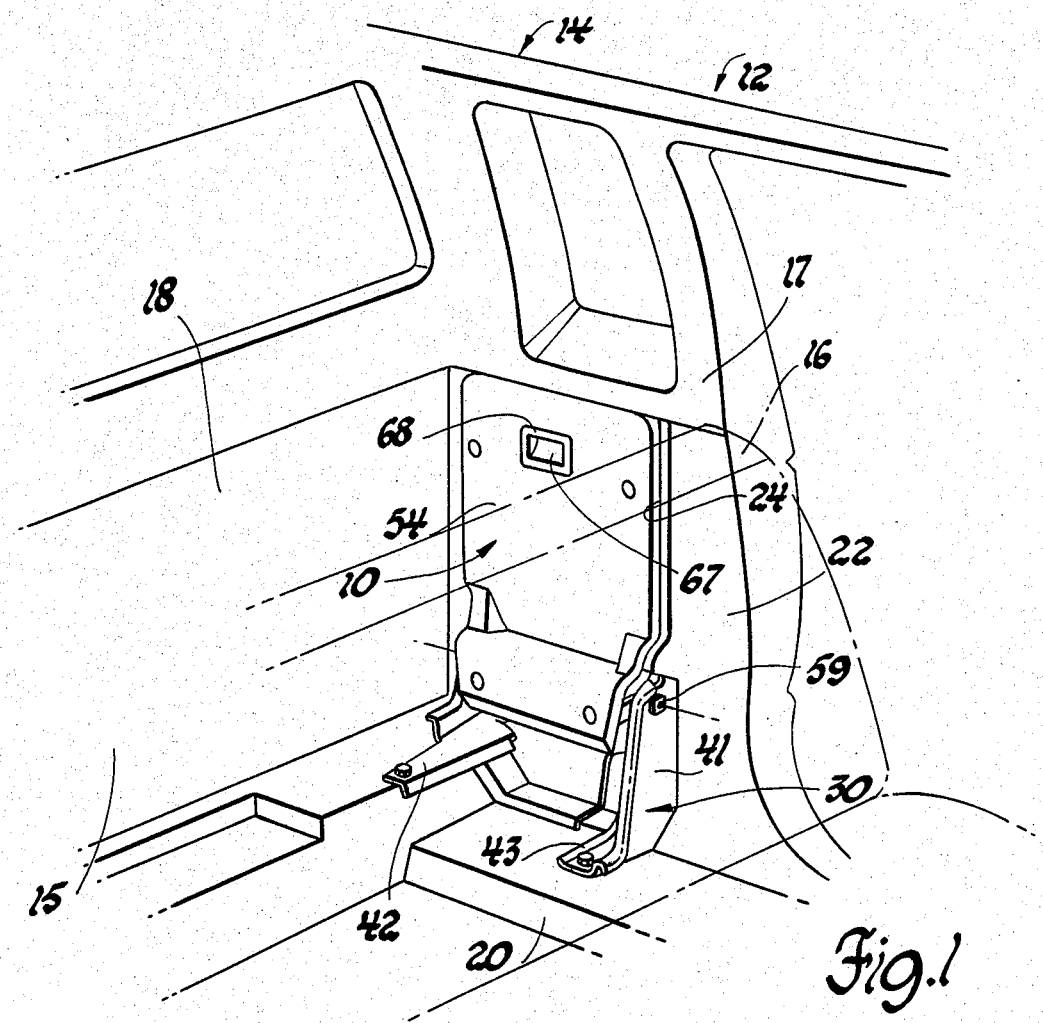
FIG. 1 is a fragmentary perspective view of a pickup truck interior showing the novel jump seat assembly of the present invention in its stored position.

Referring to FIG. 1, a pickup truck 12 is thereshown. The pickup truck 12 has an extended cab 14 which provides for a limited amount of cargo space 15 located behind its front seat 16. The extended cab 14 is defined by side walls 16 (only one of which is shown) and rear wall 18, a roof (not shown) and the truck floor structure 20. The side wall 16 includes interior trim structure 22 and has a generally rectangularly shaped recess 24 in communication with the interior compartment or cargo space 15 for receiving the seat assembly 10.

Figure 2:
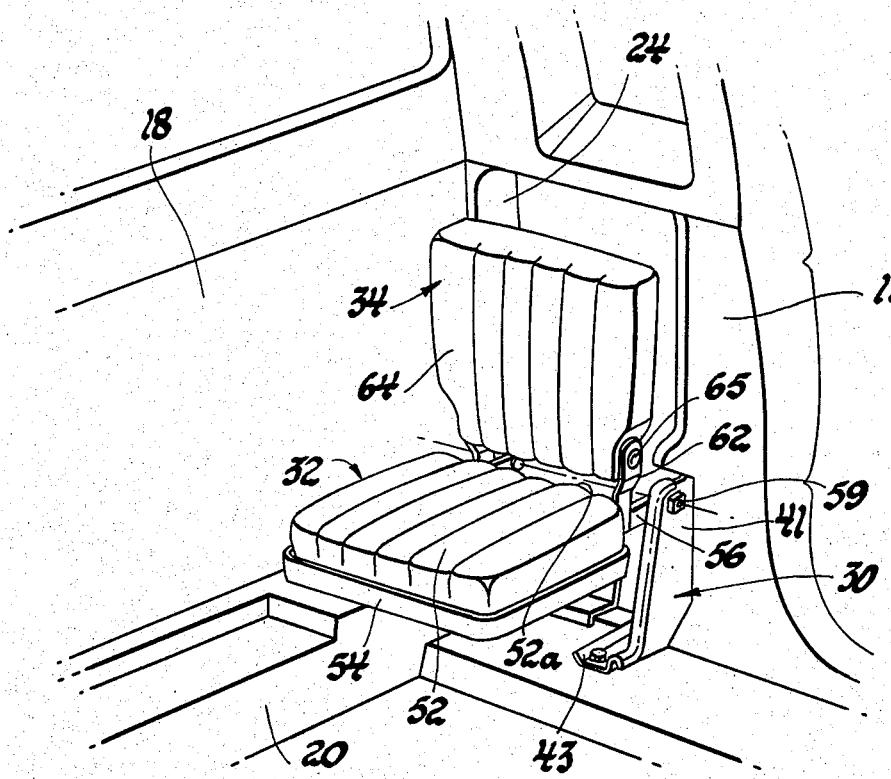
FIG. 2 is a view like that shown in FIG. 1, but with the jump seat assembly shown in its seating position.

The seat assembly 10 comprises, in general, a seat frame or frame means 30, a seat cushion unit 32 which is pivotally supported on the frame 30, the backrest unit 34 which is pivotally supported by the seat cushion unit 32, an overcenter spring means 36 which is operable to biasingly hold the seat assembly 10 in its stored position, as shown in FIG. 1, when moved thereto and to biasingly hold the seat assembly 10 in its seating position, as shown in FIG. 2, when moved thereto, and an inertia latch mechanism or means 38 which is operatively connected with the seat back unit 34 for locking the seat assembly in its position upon the vehicle being subject to lateral impact forces.

Figure 3:
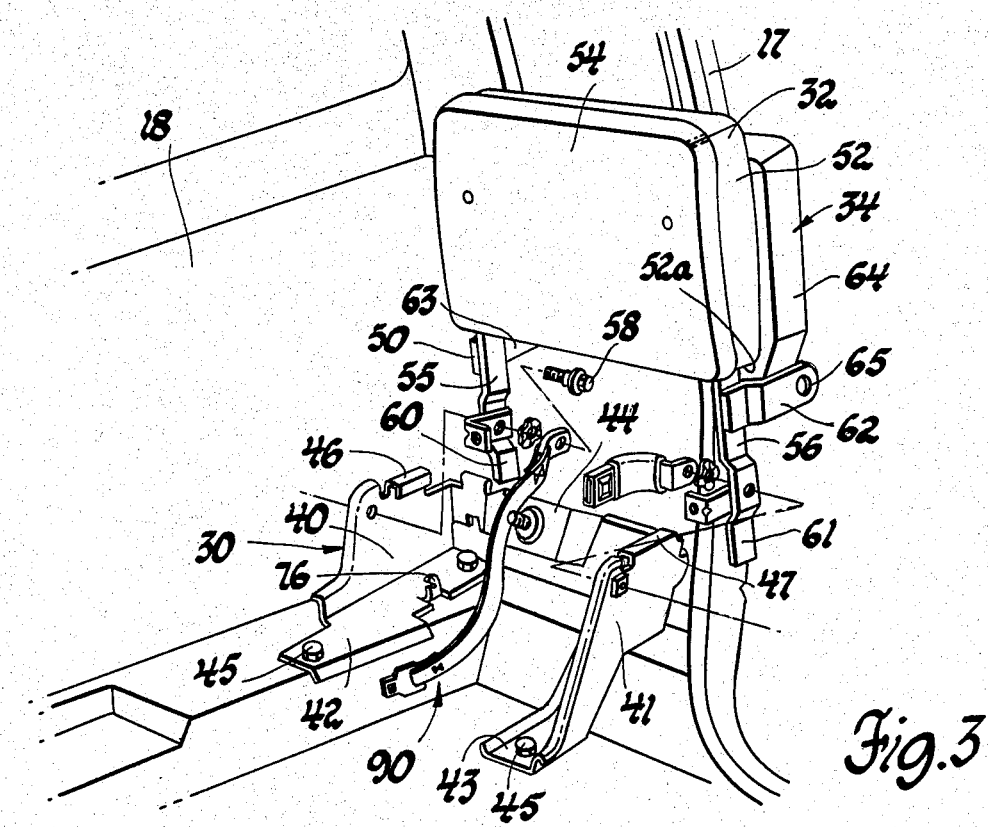
FIG. 3 is an exploded view of various parts of the jump seat assembly.

As best shown in FIG. 3, the seat frame means 30 comprises a one-piece stamped sheet metal member. The seat frame means 30 has a pair of spaced vertically extending side walls 40 and 41, a pair of feet 42 and 43 which are horizontally disposed and integral with the side walls 40 and 41, respectively, and a rear wall 44 integral with the side walls 40 and 41. The feet 42 and 43 lie against the vehicle floor structure 20 and are secured to the vehicle floor structure 20 via bolts 45. The vertical side walls 40 and 41 at their upper ends include in-turned, inverted U-shaped flanges 46 and 47, respectively, and for a reason to be hereinafter more fully described.

The seat cushion unit 32 is pivotally supported by the seat frame means 30 for movement between a generally vertical stored position, as shown in FIG. 1, and a horizontal seating position, as shown in FIG. 2. The seat cushion unit 32 includes a frame 50, a seat cushion 52 and a cover 54 for its underside. The seat cushion 52 is suitably supported on the frame 50. The frame 50 includes a pair of legs 55 and 56 at the opposite sides of the seat cushion 52 which extend rearwardly of the rear end 52a of the seat cushion 52. The legs 55 and 56 intermediate their ends are pivotally connected to the side walls 40 and 41 of the seat frame means 30 by pivot pin means 58 and 59, respectively. The legs 55 and 56 at their free ends 60 and 61, respectively, engage the underside of the flanges 46 and 47 when the seat cushion unit 32 is moved to its seating or horizontal position, as shown in FIG. 2. The inturned flanges 46 and 47 thus serve as stops for limiting the pivotal movement of the seat cushion unit 32 in a downward direction. It should be apparent that the seat cushion unit 32 when in its seating position, as shown in FIG. 2, is supported by the seat frame means 30 in a cantilever fashion.

The seat cushion unit 32 supports the back rest unit 34. To this end, the legs 55 and 56 of the frame 50 of the seat cushion unit 32 respectively include brackets 62 and 63. The brackets 62 and 63 have one end welded or otherwise secured to the legs 55 and 56, respectively. The brackets 62 and 63 extend transversely or normal to the legs 55 and 56 and are located between the rear end 52a of the seat cushion 52 and the pivot pin means 58 and 59.

The seat back unit 34 includes a cushion 64 secured to a suitable frame (not shown). The frame of the back rest unit 34 is pivotally supported for limited pivotal movement by the brackets 62 and 63 via pivot means 65. The pivot means 65 allows the back rest unit 34 to be freely pivotally moved in a counterclockwise direction, as viewed in FIG. 2, but includes a stop (not shown) which limits movement of the seat back unit 34 in a clockwise direction to an upright position, as shown in FIG. 2. It should be apparent that the seat back unit 34 is supported by the frame 50 of the seat cushion unit 32 in a cantilever fashion when in its upright seating position.

The seat cushion unit 32 and the back rest unit 34 when the seat assembly 10 is in its stored position, as shown in FIG. 1, are wholly received within the recess 24. In this position the underside or cover 54 of the seat cushion unit 32 lies flush with the adjacent interior structure 22 of the vehicle 12. Thus, the seat assembly 10 does not take up any of the cargo space 15 when in its stored position.

The seat assembly 10 can be manually moved from its stored position, as shown in FIG. 1, to its seating position, as shown in FIG. 2. To this end, the cover 54 includes a recess 67 surrounded by an escutcheon 68 to enable the seat cushion unit 32 to be manually grasped and pulled down. When the seat cushion unit 32 is pulled down to its seating position, as shown in FIG. 2, the legs 60 and 61 will engage the flanges 46 and 47, respectively, on the seat frame means 30 to position the seat cushion unit 32 in a horizontal position for seating an occupant. As the seat cushion unit 32 is moved toward its seating position the seat back unit 34 also moves outwardly of its recess 24. The seat back unit 34 will overlie the seat cushion unit 32 when the latter is moved towards its seating position, but can be rotated in a clockwise direction until it reaches its vertical stop position, as shown in FIG. 2. It should be noted that seat cushion unit 32 and seat back unit 34 when in their seating position, as shown in FIG. 2, are wholly disposed within the interior cargo space 15 and are located wholly outside of the recess 24 in the side wall 16.

Figure 7:
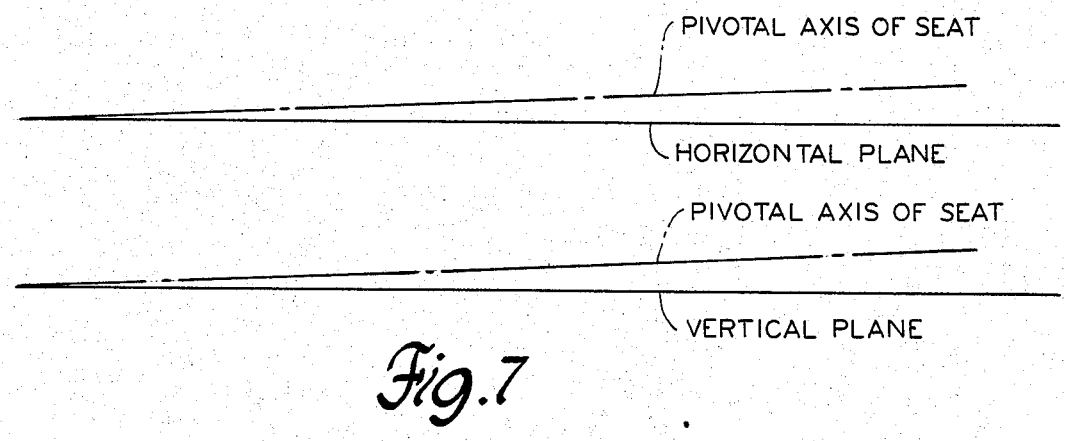
FIG. 7 is a diagrammatic view to illustrate that the jump seat assembly has a pivot axis which is skewed with respect to a horizontal plane and skewed with respect to a vertical plane.

The seat cushion unit 32 and the back rest unit 34 when moved to their seating position also swing or move away from the rear wall 18. This allows the seat cushion unit 32 and back rest unit 34 to be located closely adjacent the rear wall 18 when in its stored position, but further away from the rear wall 18 when in its seating position so as to enhance the comfort of an occupant using the jump seat assembly 10. This is accomplished by locating the pivot pin means 58 and 59 such that they have a common axis which is skewed upwardly with respect to a horizontal plane proceeding from the rear wall 18 forwardly of the vehicle 12 and also skewed with respect to a vertical plane proceeding from the rear wall 18 forwardly of the vehicle toward the side wall 16, as diagrammatically illustrated in FIG. 7. That is, the pivot pin means 59 is located higher than the pivot pin means 58 from the plane of the floor 20 and is also located closer to the side wall 16 than the pivot means 58.

Figure 4:
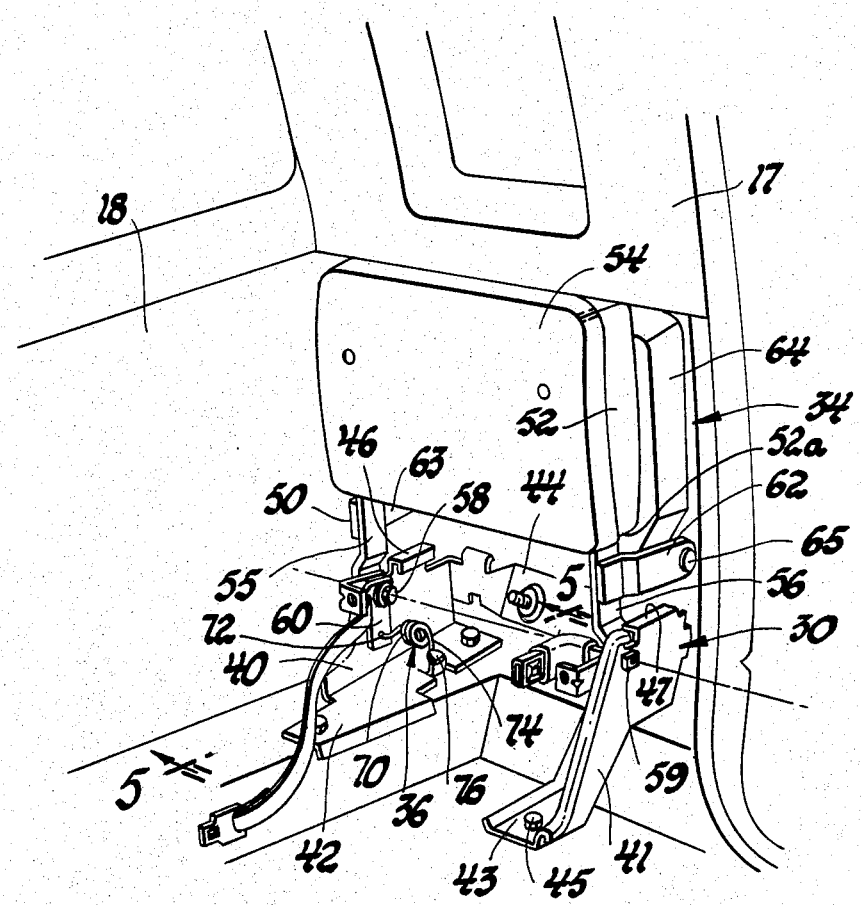
FIG. 4 is a view like that shown in FIG. 3, but showing the parts of the jump seat assembly assembled together.
Figure 5:
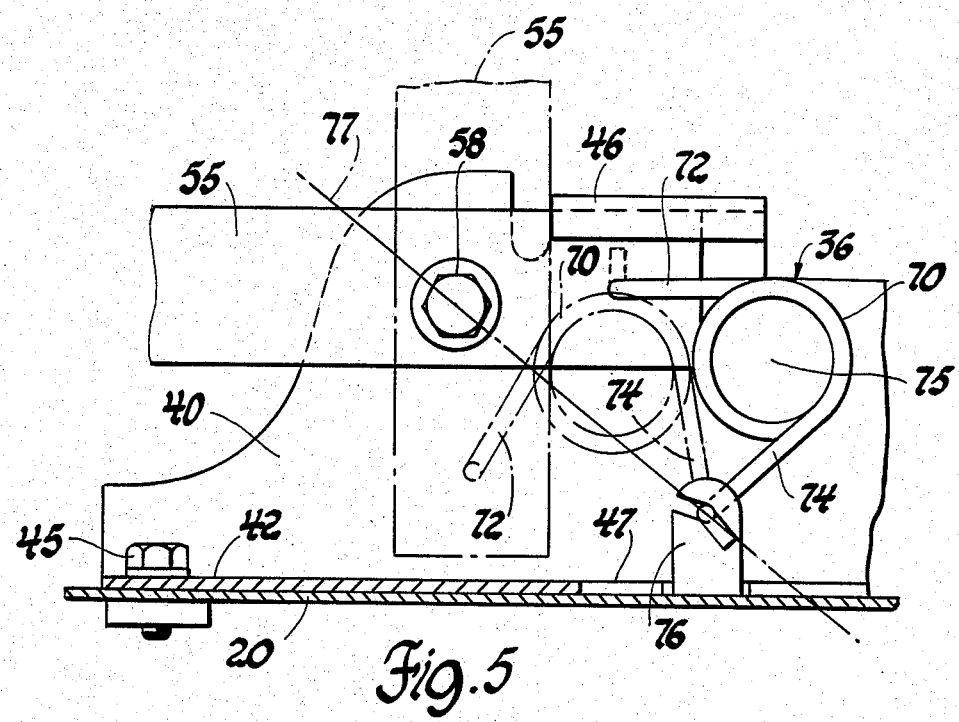
FIG. 5 is an enlarged fragmentary sectional view taken along the lines 5—5 of FIG. 4.
Figure 6:
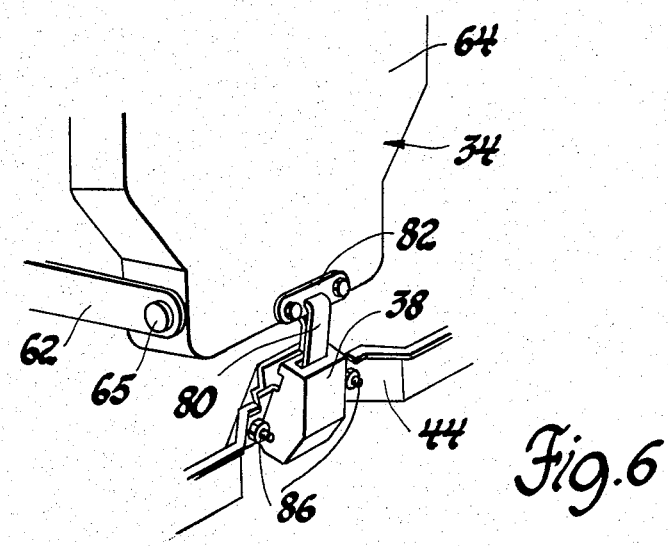
FIG. 6 is a fragmentary rear perspective view of the jump seat assembly.

The seat assembly 10 is adapted to be biasingly held in either its storage position or its seating position by the spring means 36. As best shown in FIGS. 4 and 5, the spring means 36 comprises a coil spring 70 having one leg 72 secured to the leg 55 of the seat frame 50 and its other leg 74 secured to a flange 76 extending upwardly from the foot 47 of the seat frame means 30. As best shown in FIG. 5, the coil spring 70 has a central axis 75, and the bias of the coil spring 70 is such that it tends to bias the legs 74 and 72 away from each other.

The spring means 36 functions as an overcenter spring means to biasingly hold the seat assembly 10 in either its storage or seating position. As best shown in FIG. 5, when the seat cushion unit 32 is in its seating position, as shown by the solid lines, the leg 72 of the coil spring 70 is located to the right of a plane 77 passing through the axis of the pivot means 59 and the axis of the pivotal connection between the leg 74 and the flange 76. In this position, the leg 72 functions to bias the leg 55 of the seat frame 50 against the flange 46 of the seat frame means 30. That is, it tends to move the leg 55 in a counterclockwise direction. When the seat cushion unit 32 is moved from its seating position towards its storage position, as shown by the phantom lines in FIG. 5, the leg 55 of the seat cushion unit 32 pulls the coil spring 70 from its solid line position, as shown in FIG. 5, to its phantom line position, as shown in FIG. 5. When the leg 55 of the seat cushion unit 32 is upright, the leg 72 of the spring is located to the left of the plane 77. In this position the leg 72 of the coil spring 70 biases the leg 55 of the seat frame 50 in a clockwise direction and causes the seat cushion unit 32 to be biased against the side walls 16 of the vehicle 12. It biasingly holds the seat cushion unit 32 and the back rest unit 34 within the recess 24. Likewise, when the seat cushion unit 32 is moved from its storage position, as shown in FIG. 1, to its seating position, as shown in FIG. 2, the coil spring 70 is caused to be moved from its phantom line position, as shown in FIG. 5, to its solid line position, as shown in FIG. 5, in which it will biasingly hold the leg 55 of the seat cushion unit 32 against the flange 46 of the seat frame means 30.

When the seat assembly 10 is moved to its seating position, the back rest unit 34 is prevented from moving in a counterclockwise direction, as viewed in FIG. 2, should the vehicle be subjected to lateral impact forces, by an inertia latch mechanism 38. The inertia latch mechanism 38 could be of any suitable or conventional construction, but is preferably of the type shown and described in U.S. Pat. No. 4,088,280, assigned to the same assignee as the present invention. Accordingly, it will not be described in detail herein. Suffice it to say that the inertia latch mechanism 38 includes a flexible strap 80 connected with an inertia latch (not shown), the strap 80 in turn being connected to the lower end of the back rest unit 34 by a connection means 82. The inertia latch mechanism 38 is contained in a housing 83 which is suitably secured to the back wall 44 of the seat frame means 30 via fasteners 86. The inertia latch mechanism 38 functions to allow the seat assembly 34 to be slowly opened to a seating position, but latches the seat assembly in its upright position upon the vehicle being subjected to lateral impact forces.

The seat assembly 10 also includes a seat belt means 90. The seat belt means 90 includes a flexible strap having a one end secured to the side wall 40 of the seat frame means 30 via the pivot pin means 58 and a buckle having one end secured to the side 41 of the seat frame means 30 via the pivot pin means 59.

From the foregoing, it should be apparent that a novel jump seat assembly 10 has been provided in which the seat assembly 10 when moved to its stored position is flush with the adjacent interior trim structure of the vehicle 12. It should also be apparent by supporting the seat cushion unit 32 in a cantilever fashion and supporting the back rest unit 34 in a cantilever fashion that the seat back unit 34 can be folded against the seat cushion unit 32 and that the two units can then together be pivoted or folded into the recess 24 so as to allow the seat assembly 10 to be flush with the adjacent interior trim structure of the vehicle. In addition, by pivotally supporting the seat cushion unit 32 on an axis which is skewed upwardly and toward the side wall proceeding from the rear wall 18 of the vehicle 12, the seat cushion unit 32 and seat back unit 34 fold or swing downwardly into the seating position by moving slightly away from the rear wall of the vehicle so as to enhance the seating comfort of the occupant. This movement also allows the seat cushion unit 32 to be folded back into the recess 24 at a location closely adjacent the rear wall 18.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In an automotive vehicle having a body including interior trim means defining an interior compartment and a recess in the trim means facing the interior compartment, a foldable jump seat assembly supported by said body adjacent said recess which can be folded from a storage position within said recess to a seating position, said seat assembly comprising a stationary seat frame secured to the vehicle body and having a pair of spaced side supports, a seat cushion unit including a seat cushion having front and rear ends and a support means including a pair of spaced side legs extending from the rear end of the seat cushion, said legs intermediate their ends being pivotally supported on said side supports of said seat frame by pivot means for movement between an upright storage position within said recess and in which said seat cushion has its underside disposed substantially flush with adjacent areas of said interior trim means and a seating position in which said seat cushion is substantially horizontally disposed, said legs adjacent their outer free end portions engaging stops on said side supports of said seat frame when the seat cushion is in its substantially horizontal position whereby said seat cushion assembly is supported in a cantilever fashion by said seat frame, a pair of spaced brackets secured to said legs of said seat cushion assembly intermediate the rear end of the cushion and said pivot means and extending transversely of said legs, a seat back unit including a back rest and means for pivotally connecting said seat back unit at its lower end to said brackets for limited pivotal movement relative thereto and with the seat back unit at its upper end being free whereby said seat back unit is caused to be moved downwardly and outwardly of said recess so that said seat back unit is disposed wholly outwardly of said recess when said seat cushion unit is moved from its storage position to its seating position, said seat back unit being caused to be moved in the reverse direction in response to movement of said seat cushion unit from its seating position to its storage position so that the seat back unit is disposed behind the seat cushion in the storage position, and means for biasingly retaining the seat assembly in either its storage or seating position when moved thereto.

2. In an automotive vehicle having a body which includes a cab having sides and a rear and interior trim means on said sides and rear which defines an interior compartment, a recess in one of said sides adjacent the rear and which faces the interior compartment, a foldable jump seat assembly supported by said body adjacent said recess and which can be folded from a storage position within said recess to a seating position, said seat assembly comprising a stationary seat frame secured to the vehicle body and having a pair of spaced side supports, a seat cushion unit including a seat cushion having front and rear ends and a support means including a pair of spaced side legs extending from the rear end of the seat cushion, said legs intermediate their ends being pivotally supported on said side supports of said seat frame by pivot means for movement between an upright storage position within said recess and in which said seat cushion has its underside disposed substantially flush with adjacent areas of said interior trim means and a seating position in which said seat cushion is substantially horizontally disposed, said pivot means having a common axis which is skewed in an upward direction with respect to a horizontal plane proceeding from said rear and which is skewed toward a vertical plane containing said side proceeding from said rear whereby said seat cushion assembly is caused to be moved away from said rear when moved toward its seating position, said legs adjacent their outer free end portions engaging stops on said side supports of said seat frame when the seat cushion is in its substantially horizontal position whereby said seat cushion unit is supported in a cantilever fashion by said seat frame, a pair of spaced brackets secured to said legs of said seat cushion assembly intermediate the rear end of the cushion and said pivot means and extending transversely of the legs, a seat back unit including a back rest and means for pivotally connecting said seat back unit at its lower end to said brackets for limited pivotal movement relative thereto and with the seat back unit at its upper end being free whereby said seat back unit is caused to be moved downwardly and outwardly of said recess so that said seat back unit is disposed wholly outwardly of said recess when said seat cushion unit is moved from its storage position to its seating position, said seat back unit being caused to be moved in the reverse direction in response to movement of said seat cushion unit from its seating position to its storage position so that the seat back unit is disposed behind the seat cushion in the storage position, and means for biasingly retaining the seat assembly in either its storage or seating position when moved thereto.

3. In an automotive vehicle having a body which includes a floor and a cab having side and rear walls behind its front seat to define an interior cargo compartment, interior trim means on said sides including means defining a recess facing the interior cargo compartment, a foldable jump seat assembly supported by said body adjacent said recess and which can be folded from a storage position within said recess to a seating position, said seat assembly comprising a stationary seat frame secured to the vehicle body and having first and second spaced side supports, a seat cushion unit including a seat cushion having front and rear ends and a support means including first and second spaced side legs extending from the rear end of the seat cushion, said first and second legs intermediate their ends being pivotally supported on said first and second side supports of said seat frame by first and second pivot means, respectively, for movement between an upright storage position within said recess and in which said seat cushion has its underside disposed substantially flush with adjacent area of said interior trim means and a seating position in which said seat cushion is substantially horizontally disposed, said first pivot means being located closely adjacent said rear wall, said second pivot means being spaced vertically from said floor a greater distance than said first pivot means and being located closer to said side wall than said first pivot means whereby said seat cushion unit pivots about an axis which is skewed both upwardly from the floor and laterally toward the side wall proceeding from the rear wall so that said seat cushion unit is caused to be moved away from said rear wall when moved toward its seating position, said legs adjacent their outer free end portions engaging stops on said side supports of said seat frame when the seat cushion is in its substantially horizontal position whereby said seat cushion assembly is supported in a cantilever fashion by said seat frame, a pair of spaced brackets secured to said legs of said seat cushion assembly intermediate the rear end of the cushion and said pivot means and extending tranversely of the legs, a seat back unit including a back rest and means for pivotally connecting said seat back unit at its lower end to said brackets for limited pivotal movement relative thereto and with the seat back unit at its upper being free whereby said seat back unit is caused to be moved downwardly and outwardly of said recess so that said seat back unit is disposed wholly outwardly of said recess when said seat cushion unit is moved from its storage position to its seating position, said seat back unit being caused to be moved in the reverse direction in response to movement of said seat cushion unit from its seating position to its storage position so that the seat back unit is disposed behind the seat cushion in the storage position, and means for biasingly retaining the seat assembly in either its storage or seating position when moved thereto.

4. The combination, as defined in claim 3, and wherein said means for biasingly retaining the seat assembly in either its storage or seating position is an overcenter spring means.

5. The combination, as defined in claim 4, wherein said spring means comprises a coil spring having one leg thereof anchored to said seat frame and its other leg anchored to said first leg at a location beneath said first pivot means.

6. The combination, as defined in claim 3, and including an inertia latch means operatively connected with said seat back unit for locking the latter in an upright position upon the vehicle being subjected to lateral impact forces.

* * * * *